(12) United States Patent
Markel et al.

(10) Patent No.: US 8,441,250 B2
(45) Date of Patent: May 14, 2013

(54) METHOD AND APPARATUS FOR MONITORING ELECTRICAL PROPERTIES OF POLYMERIZATION REACTOR WALL FILM

(75) Inventors: Eric J. Markel, Kingwood, TX (US); Timothy R. Lynn, Glen Gardner, NJ (US)

(73) Assignee: Univation Technologies, LLC, Houston, TX (US)

( * ) Notice: Subject to any disclaimer, the term of this patent is extended or adjusted under 35 U.S.C. 154(b) by 393 days.

(21) Appl. No.: 12/780,088

(22) Filed: May 14, 2010

(65) Prior Publication Data

US 2010/0289482 A1  Nov. 18, 2010

Related U.S. Application Data

(60) Provisional application No. 61/179,105, filed on May 18, 2009.

(51) Int. Cl.
*G01R 1/06* (2006.01)
(52) U.S. Cl.
USPC .............................. 324/149; 324/71.1; 324/453
(58) Field of Classification Search ......................... None
See application file for complete search history.

(56) References Cited

U.S. PATENT DOCUMENTS

| | | | | |
|---|---|---|---|---|
| 6,008,662 A | * | 12/1999 | Newton et al. | 324/724 |
| 7,985,811 B2 | * | 7/2011 | Hagerty et al. | 526/60 |
| 2008/0027185 A1 | * | 1/2008 | Markel et al. | 526/59 |
| 2008/0042655 A1 | * | 2/2008 | Markel et al. | 324/457 |

* cited by examiner

*Primary Examiner* — Minh N Tang
(74) *Attorney, Agent, or Firm* — Kristina Leavitt; Jennifer A. Schmidt

(57) ABSTRACT

Disclosed is a method for using at least one static probe during polymerization in a fluid bed polymerization reactor system to monitor a coating on a surface of the reactor system and a distal portion of each static probe, wherein the coating is exposed to flowing fluid within the reactor system during the reaction. The surface may be a reactor bed wall (exposed to the reactor's fluid bed) and the coating is exposed to flowing, bubbling fluid within the fluid bed during the reaction. The method may include steps of: during the polymerization reaction, operating the static probe to generate a sequence of data values ("high speed data") indicative of fluid flow variation (e.g., bubbling or turbulence), and determining from the high speed data at least one electrical property of the coating (e.g., of a portion of the coating on the distal portion of the static probe).

19 Claims, 4 Drawing Sheets

METHOD AND APPARATUS FOR MONITORING ELECTRICAL PROPERTIES OF POLYMERIZATION REACTOR WALL FILM

CROSS REFERENCE TO RELATED APPLICATIONS

This application claims the benefit of U.S. Provisional Application Ser. No. 61/179,105, filed on May 18, 2009, the disclosure of which is incorporated by referenced in its entirety.

FIELD OF THE INVENTION

The invention pertains to methods for monitoring electrical properties of a fluid bed reactor wall, which may be coated with a film (e.g., a polymer film), during a polymerization (e.g., olefin polymerization) reaction in the reactor. Preferably, the methods are performed in on-line fashion during the reaction (e.g., using probes external to the reactor).

BACKGROUND

The expression "on-line" generation of data (or performance of another operation) during a reaction herein denotes generation of the data (or performance of the other operation) sufficiently rapidly so that the data (or result of the operation) is available essentially instantaneously or sometime thereafter for use during the reaction. The expression "generation of data in on-line fashion" during a reaction is used synonymously with the expression on-line generation of data during a reaction. Generation of data from a laboratory test (on at least one substance employed or generated in the reaction) is not considered "on-line generation" of data during the reaction, if the laboratory test consumes so much time that parameters of the reaction may change significantly during the time required to conduct the test. It is contemplated that on-line generation of data may include the use of a previously generated database that may have been generated in any of a variety of ways including time-consuming laboratory tests.

With reference to a product being produced by a continuous reaction, the expression "instantaneous" value of a property of the product herein denotes the value of the property of the most recently produced quantity of the product. Because of the back-mixed nature of a gas phase polymerization reactor, the most recently produced polymer product typically undergoes mixing with previously produced quantities of product before a mixture of the recently and previously produced product exits the reactor. In contrast, with reference to a product being produced by a continuous reaction, the expression "average" (or "bed average") value (at a time "T") of a property herein denotes the value of the property of the product that exits the reactor at time T.

The expression "polyethylene" denotes at least one polymer of ethylene and optionally one or more $C_3$-$C_{10}$ α-olefins, while the expression polyolefin denotes at least one polymer (or copolymer) of one or more $C_2$-$C_{10}$ α-olefins.

Throughout this disclosure, the abbreviation "MI" denotes melt index. Also throughout this disclosure, the term "density" denotes the intrinsic material density of a polymer product (in units of g/cc unless otherwise stated), measured in accordance with ASTM-D-1505-98 unless otherwise stated.

One method for producing polymers is gas phase polymerization. A conventional gas phase fluidized bed reactor commonly employs a fluidized dense-phase bed typically including a mixture of reaction gas, polymer (resin) particles, catalyst, and (optionally) other additives. Typically, any of several process control variables will cause the reaction product to have certain, preferably desired, characteristics.

Generally in a gas-phase fluidized bed process for producing polymers from monomers, a gaseous stream containing one or more monomers is continuously passed through a fluidized bed under reactive conditions in the presence of an activated catalyst. This gaseous stream is optionally withdrawn from the top of the fluidized bed and recycled back into the reactor. Simultaneously, polymer product is withdrawn from the reactor and new monomer is added to replace the polymerized monomer. The recycled gas stream is heated in the reactor by the heat of polymerization. This heat is typically removed in another part of the cycle by a cooling system external to the reactor.

It is important to remove heat generated by the reaction in order to maintain the temperature of the resin and gaseous stream inside the reactor at a temperature below the polymer melting point and/or catalyst deactivation temperature. Further, heat removal is important to control the reactor temperature to prevent excessive stickiness of polymer particles that if left unchecked, may result in loss of fluidization or agglomeration of the sticky particles which may lead to formation of chunks or sheets of fused polymer that cannot be removed as product.

Conventional fluid bed polymerization reactors often pretreated (e.g., by "chromocene" treatment) to form a polymer film on the reactor wall surfaces that will be exposed to polymer resin during normal polymerization operation. Such a polymer film coating on the bed wall of a pretreated reactor is intended to function as an insulating layer that reduces static charging in the reactor system, thereby reducing the potential for sheeting, during normal polymerization reactions. It is believed that static charging of polymer (e.g., polyethylene) resin in the bed during polymerization is strongly influenced by the electrical interaction between the polymer wall film and the reactor/cycle gas, and is thus strongly influenced by the electrical characteristics of the polymer wall film. For example, a thick insulating wall film would limit charge transfer from the polymer in the bed to ground.

Although the polymer wall film on a precoated reactor bed wall is typically thin (e.g., in a range from about 1 to about 20 mils, or 0.025 to 0.50 millimeters, where one "mil" denotes 0.001 inches) and typically does not have uniform thickness throughout the bed wall, it can be effective in reducing static charging and is often durable. Often, a typically thin polymer film of this type has a service life of at least four years before retreatment is required, if (as is typical) the film consists of a high density, high molecular weight (very low melt index) polymer. Such a film having high density, high molecular weight, and low melt index, is typically highly resistant to abrasion by the softer polymer typically present in the fluid bed during normal polymerization operation.

Conventional chromocene treatment methods can form effective and reliable polymer coatings on the bed walls of fluidized bed polymerization reactors. Sometimes, however, such methods fail to form effective and reliable polymer coatings and instead form insufficiently thick polymer on at least some bed wall portions. Without an effective polymer coating, a reactor that has undergone such failed treatment is sensitive to static charging and sheeting, particularly during polymerization reactions using metallocene catalysts.

Also, the polymer coatings formed by conventional chromocene treatment methods on bed walls (of fluid bed polymerization reactors) can deteriorate or become contaminated over time. For example, they can deteriorate as a result of erosion and/or deposition of impurities thereon (e.g., decomposition products of aluminum alkyls). Such deterioration and/or contamination can have a major effect on operability of the reactor. In practice, the reactor static baseline does not change suddenly due to the contamination or deterioration. Rather, the contamination or deterioration usually occurs over a period of time and as this happens, static activity and sheeting problems gradually develop and appear first during the production of certain resin products. These products, usually characterized as having higher molecular weights and higher densities, are referred to as the sensitive reactor grades. As the static baseline deteriorates further (e.g., as the wall coating becomes more contaminated) static and sheeting problems begin to occur with more and more products. The sensitivity of sheeting risk to different resin grades appears only with a contaminated or deteriorated bed wall coating. It is desirable to operate the reactor with the coating in good condition.

It is conventional to perform reactor system retreatment to remove a bad (deteriorated or contaminated) bed wall coating and replace it with a new polymer coating when necessary. Conventional retreatment methods involve preparation of the bed wall (typically by removal of an existing bad polymer coating) and the in situ creation of a new polymer coating on the wall. One such conventional retreatment method is the above-mentioned chromocene treatment method; another is known as hydroblasting. Wall retreatment is expensive and requires reactor shutdown for retreatment. It would be desirable to have a reliable method for monitoring the state of an existing bed wall coating during polymerization operation of a reactor, e.g., to determine when retreatment is or is not needed.

In the past, polymer coatings on the bed walls of fluidized bed polymerization reactors were typically inspected on an opportunistic basis (when the reactors were shut down) by persons who physically entered the reactor vessels with appropriate inspection instruments. Alternatively, the conventional metal coupon approach was used to inspect the coatings but this technique had to be performed in an off-line fashion under conditions not necessarily representative of actual operating conditions. There is a need for a method for monitoring (e.g., inspecting and/or characterizing) polymer coatings on bed walls of fluid bed polymerization reactors (e.g., to assess whether the coatings have deteriorated or become contaminated) during performance of polymerization reactions in the reactors (e.g., in on-line fashion during each reaction using a probe external to the reactor).

Herein, the expression that a probe is "external" to a reactor (or is an "external" probe) denotes that the probe is configured and mounted so as neither to interfere significantly with nor significantly affect a polymerization reaction occurring in the reactor during operation of the probe to monitor the reaction or reactor. For example, a probe having a distal portion (e.g., tip) that is flush with a bed wall of a reactor or extends slightly into the bed from the bed wall may be an "external" probe if the probe neither interferes significantly with nor otherwise significantly affects a polymerization reaction in the reactor while the probe operates during the reaction to monitor voltage in the bed (or to generate bed voltage data that is used to monitor a film that coats the bed wall and the probe's distal portion).

Herein, "bed static" denotes static charge (and/or the electrical potential due to such charge) that is generated by frictional contact involving contents of a fluid bed polymerization reactor (e.g., polymer resin). For example, bed static can result from frictional contact of polymer resin in the bed with the reactor's bed wall (the wall in the fluidized bed section of the reactor). The bed wall can be coated or uncoated. It is conventional to monitor reactor bed static using probes external to the reactor. Static probes suitable for measuring bed static are described in, for example, U.S. Pat. Nos. 6,008,662 and 6,905,654.

However, it had not been known how to use the output of one or more static probes (e.g., data indicative of voltage and/or current readings, generated using an external static probe) to monitor a property of a coating (e.g., polymer coating) on a bed wall of a fluid bed polymerization reactor during performance of a polymerization reaction in the reactor (or to monitor a property of the bed wall itself during performance of the reaction in the reactor). Nor had it been known how to use the output of one or more static probes (e.g., external static probes) to assess whether such a coating (or the bed wall itself) has deteriorated or become contaminated.

In a class of embodiments, at least one static probe (e.g., an external static probe) is used to monitor at least one property of a coating (typically a polymer coating) on a bed wall of a fluid bed polymerization reactor (e.g., to assess whether the coating has deteriorated or become contaminated) during performance of a polymerization reaction in the reactor. In some embodiments, the monitoring is performed in on-line fashion during the reaction. In some embodiments the bed wall is not coated and at least one static probe is used to monitor at least one property of the wall itself (e.g., to assess whether the wall has deteriorated or become contaminated) during performance of the reaction.

A shortcoming of conventional static probes (for monitoring fluid bed polymerization reactions) is that they measure only one of the following two entirely different effects: (i) current flow by direct contact with the bed (i.e., charge transfer from the bed to a probe surface); and (ii) inductive current flow (in which the electric field inside the reactor induces a charge on the probe surface without direct contact with the probe). It would be desirable to measure both these effects simultaneously at the same location in the bed.

SUMMARY

In a class of embodiments, the invention is a method for using at least one static probe during performance of a polymerization reaction in a fluid bed reactor system (sometimes referred to herein as a "reactor" for convenience), to monitor a coating on a surface of the reactor system and a distal portion of each static probe, where the coating is exposed to flowing fluid within the reactor system during performance of the method. Typically, the surface is a bed wall of the reactor (a wall exposed to the reactor's fluid bed) and the coating is exposed to flowing (e.g., bubbling) fluid within the fluid bed during the reaction. Typically, each static probe is an external probe mounted (e.g., directly to the reactor) with its distal portion flush with the reactor bed wall or extending slightly into the fluid bed from the bed wall. Typically, the coating is a thin film of polymer (e.g., having thickness less than 0.50 millimeters or in a range from about 0.025 to 0.50 millimeters) that has been precoated on the bed wall and distal portion of each probe prior to performance of the reaction. In embodiments in which the coating to be monitored is on the reactor bed wall (and on a distal portion of each static probe), the method includes the steps of:

(a) during a first interval of time during performance of the reaction in the reactor system, operating the static probe to generate a sequence of data values (sometimes referred to herein as "high speed data") indicative of bubbling in the fluid bed. The high speed data typically include frequency components in a range ("bubbling frequency range") from about 1 Hz to about 10 Hz, or from about 2 Hz to about 6 Hz, and the duration of the first interval is typically at least one minute (e.g., several minutes); and (b) determining from the high speed data at least one electrical property of the coating (e.g., at least one electrical property of a portion of the coating on the distal portion of the static probe).

The bubbling frequency range (for each static probe) is the range of frequencies of an electrical signal induced in the static probe by movement of bubbles in the fluid bed relative to the static probe. In some embodiments, the bubbling frequency range has been independently determined (e.g., determined to be the bandwidth of bed DP readings generated during the reaction or a polymerization reaction similar thereto, where each bed DP reading is a measured instantaneous pressure difference between the bottom and top of the fluid bed), and each said electrical property of the coating is generated in step (b) from frequency components of the high speed data in a range that coincides with or includes the independently determined bubbling frequency range. In some embodiments, the high speed data are generated by sampling the output of each static probe with a sampling frequency of at least 100 Hz.

In some embodiments, at least one electrical property determined in step (b) is a breakdown voltage of the coating. In some embodiments, the method also includes the step of:

(c) determining from at least one electrical property determined in step (b) at least one of a degree of deterioration of the coating and a degree of contamination of the coating. For example, step (c) can include the step of determining a degree of deterioration of the coating from a determined breakdown voltage of the coating on the distal portion of the static probe.

In some embodiments, steps (a) and (b) (or all of steps (a), (b), and (c)) are performed in on-line fashion during the reaction. In some embodiments, the method also includes a step of determining from at least one electrical property determined in step (b) whether to perform retreatment of the surface, e.g., to remove the coating (e.g., because it has deteriorated or become contaminated to a sufficient degree) and replace it with a new coating, or otherwise to reestablish a useful coating on the surface (e.g., by using a continuity aid to deposit coating material on the surface). In some embodiments, at least one electrical property determined in step (b) is or determines information that usefully characterizes at least one of the state of charge in the bed, the mechanism of charge generation, fluidization in the reactor, and the state of the coating.

In some embodiments, the first interval of time includes a set of subintervals, and step (b) includes the steps of:

determining standard deviation values, by determining for each subinterval in the set of subintervals, from the high speed data generated in said each subinterval of the first interval, the standard deviation of the high speed data generated in the subinterval; and determining electrical potential in the fluid bed during said each subinterval of the first interval from the high speed data and the standard deviation values.

In other embodiments, the first interval of time includes a set of subintervals, the high speed data are indicative of average power drawn by the probe (due to current induced in the probe by charge in the fluid bed) during said each subinterval of the first interval, and step (b) includes the step of:

determining electrical potential in the fluid bed during said each subinterval of the first interval from the high speed data.

In some embodiments, the first interval of time includes a set of subintervals, and step (b) includes the steps of generating averaged data values from the high speed data by averaging, for each subinterval in the set of subintervals the high speed data generated in said each subinterval, and determining from the averaged data values and the high speed data at least one said electrical property of the coating.

In another class of embodiments, the first interval of time includes a set of subintervals, and step (b) includes the steps of:

determining cross correlated (e.g., autocorrelated) values, by determining for said each subinterval of the first interval, a cross correlation of the high speed data generated in the subinterval with one of said high speed data generated in the subinterval and a processed version of said high speed data generated in the subinterval; and determining electrical potential in the fluid bed during said each subinterval of the first interval from the high speed data and the cross correlated values.

The cross correlated values are indicative of movement of bubbles in the fluid bed past the probe. For example, when the cross correlated values are plotted (as voltages versus time), displacement voltages indicated by the data values may be determined, where each such "displacement voltage" consists of a peak (maximum) voltage followed with a lag time (e.g., in the range of 0.5 to 2 seconds) by a minimum voltage, or a minimum voltage followed (with a lag time in the same range) by a maximum voltage. In this example, a relative measure of bed static (voltage between the probe's coated distal portion and ground) is determined from the displacement voltages in a manner to be described herein.

Static measurements performed will typically depend on both average bed static and fluidization (bubble size and velocity, and bed non-uniformities). Experience has shown that fluidization behavior is reproducible in the lower section of a typical polymerization reactor fluid bed, given the narrow range of gas velocities employed commercially and proximity to the distributor plate (which controls bubble formation), to typically determine accurately a relative measure of electrical potential in the lower section of such a fluid bed. Fluidization in the upper bed may be more variable and strongly dependent on coalescence of small bubbles to form large, fast bubbles. Thus, determination of a relative measure of electrical potential in the upper section of a fluid bed may be subject to greater uncertainty due to fluidization effects than electrical potential in the upper section of a fluid bed.

In typical embodiments, the method includes the step of performing repetitions of steps (a) and (b) sequentially, each performance of step (a) during a different time interval. For example, in some such embodiments the method also includes the steps of:

(c) after step (a) but during a second interval of time during performance of the reaction in the reactor system, operating the static probe to generate an additional sequence of data values (referred to herein as "additional high speed data") indicative of bubbling in the fluid bed;

(d) determining from the additional high speed data at least one electrical property of the coating; and (e) in response to the electrical properties determined during steps (b) and (d), monitoring at least one of deterioration and contamination of the coating over time.

In some embodiments, the first interval of time includes a set of subintervals, the second interval of time includes a second set of subintervals, step (b) includes the steps of generating averaged data values from the high speed data by averaging, for each subinterval in the set of subintervals, the high speed data generated in said each subinterval, and determining from the averaged data values and the high speed data at least one said electrical property of the coating, and step (d)

includes the steps of generating additional averaged data values from the additional high speed data by averaging, for each subinterval in the second set of subintervals, the additional high speed data generated in said each subinterval, and determining from the additional averaged data values and the additional high speed data at least one said electrical property of the coating.

In a class of embodiments, the invention is a bifunctional static probe configured for use in monitoring a polymerization reaction in a fluid bed reactor system, including:

an insulated probe having an electrically insulating distal portion configured to be exposed during said monitoring to flowing fluid within the reactor system (e.g., with the insulating distal portion having a distal surface flush with the bed wall or other reactor surface, or extending slightly into the fluid flow from the reactor surface) and a conductive proximal portion in contact with the distal portion; and an electrically conducting bare probe, positioned coaxially with the insulated probe and having an electrically conducting distal surface configured to be exposed during said monitoring to the flowing fluid within the reactor system (e.g., with the conducting distal surface flush with the bed wall or other reactor surface, or extending slightly into the fluid flow from the reactor surface).

Typically, the bare probe is at least substantially cylindrical, the insulated probe is at least substantially annular, and the distal surface of the bare probe is aligned with a distal surface of the insulated probe's insulating distal portion. Preferably, the bare probe has a side surface, the insulated probe has an inner side surface facing the bare probe's side surface, and the bifunctional static probe includes an electrically insulating layer between the insulated probe's inner side surface and the bare probe's side surface for insulating the insulated probe from the bare probe. Typically, the insulated probe has an electrically insulating outer side layer for insulating the conductive proximal portion from a conductive element of the reactor system (e.g., a bed wall) when the bifunctional static probe is mounted to such element.

The bifunctional probe is capable of measuring (preferably simultaneously) direct current flow from the fluid bed of a reactor to a surface of the bare probe, and inductive current flow from the bed to the insulated probe (without direct contact between the bed and a conductive element of the insulated probe). Measuring both these effects simultaneously (or substantially simultaneously) at the same location in the bed can provide information critical for characterizing the state of charge in the bed, the mechanism of charge generation, fluidization (via capacitance measurements), and the state of wall coatings (e.g., deposition, replenishment, deterioration, and contamination of a polymer or wax coating on a bare conductive distal surface of the probe, using readings from an insulated distal surface of the probe as reference).

Any of a variety of signal processing techniques may be employed to process the output of the inventive bifunctional static probe. For example, embodiments of the inventive method (described herein) can employ the bifunctional probe to generate high speed data indicative of bubbling in a fluid bed, and determine from the high speed data at least one electrical property of a coating on a reactor wall and a distal portion of the probe (e.g., an electrical property of a portion of the coating on the bare probe and the insulated probe of the bifunctional probe). In some cases, frequency analysis may be employed to extract (from the output of the bifunctional probe) the component of induction due to variations in local capacitance due to passage of bubbles. In other cases, wavelet methods and/or short-term Fourier methods for analysis of asynchronous signals may be used to extract a relative measure of bubbling-related charge density from the bifunctional probe's output. The absence of bubbling may indicate poor fluidization (similar to cold-banding) which may be a precursor to sheeting.

In some embodiments of the inventive monitoring method, the coating to be monitored is not on a reactor bed wall. Instead the coating is on another surface of a fluid bed reactor system (and on a distal portion of each static probe employed during the monitoring) exposed to flowing fluid during the reaction. For example, the coating may be on a surface in the entrainment zone of the reaction system and the monitoring may employ at least one static probe positioned in the entrainment zone to monitor carryover static. In this context, the expression "entrainment zone" of a fluidized bed reactor system denotes any location in fluid bed polymerization reactor system outside the dense phase zone of the system (i.e., outside the fluid bed), and the expression "carryover static" denote static charging that results from frictional contact by particles (e.g., catalyst particles and resin particles) in the entrainment zone (e.g., against metal walls of the gas recycle line or against another component of the entrainment zone). In this class of embodiments, the invention is a method for using at least one static probe during performance of a polymerization reaction in a fluid bed reactor system, to monitor a coating on an element of the entrainment zone of the reactor system and a distal portion of each static probe. Typically, each static probe is an external probe mounted with its distal portion flush with the relevant entrainment zone element or extending slightly into the fluid flow from such element.

In a broader class of embodiments, the inventive method is a method for using at least one static probe during performance of a polymerization reaction in a fluid bed polymerization reactor system (sometimes referred to herein as a "reactor"), to monitor a coating on a surface of the reactor system (e.g., the reactor's bed wall or a surface of the reactor's entrainment zone) and a distal portion of each static probe, where the coating is exposed to flowing fluid within the reactor system during performance of the method. In this class of embodiments, the method includes the steps of:

(a) during performance of the reaction in the reactor system, operating the static probe to generate a sequence of data values (sometimes referred to herein as "high speed data") indicative of fluid flow variation (e.g., bubbling or turbulence) during a first interval of time; and (b) determining from the high speed data at least one electrical property of the coating (e.g., of a portion of the coating on the distal portion of the static probe).

Any of the techniques described herein for determining an electrical property of a bed wall coating from high speed data may be employed to determine an electrical property of a coating (e.g., on an entrainment zone component) other than a bed wall coating, from the high speed data determined in this broader class of embodiments.

For example, in the broader class of embodiments, the high speed data may include frequency components in a range from about 1 Hz to about 10 Hz, or from about 2 Hz to about 6 Hz, and the duration of the first interval is much longer than the inverse of the lowest of these frequency components (e.g., the first interval may be several minutes if the lowest frequency component of interest in the high speed data is 1 Hz). The frequency range of interest (for each static probe) is the range of frequencies of an electrical signal induced in the static probe by the fluid flow variation relative to the static probe during the reaction.

In some embodiments in the noted broader class, at least one electrical property determined in step (b) is a breakdown voltage of the coating. In some embodiments in the noted broader class, the method also includes the step of: (c) determining from at least one electrical property determined in step (b) at least one of a degree of deterioration of the coating and a degree of contamination of the coating. For example, step (c) can include the step of determining a degree of deterioration of the coating from a determined breakdown voltage of the coating on the distal portion of the static probe. In some embodiments in the noted broader class, steps (a) and (b) (or all of steps (a), (b), and (c)) are performed in on-line fashion during the reaction.

Some embodiments of the inventive method employ the inventive bifunctional probe to generate high speed data. Other embodiments of the inventive method employ other static probes to generate high speed data (e.g., conventional static probes of the type described in U.S. Pat. Nos. 6,008,662 and 6,905,654).

DETAILED DESCRIPTION

Before the present compounds, components, compositions, devices, softwares, hardwares, equipments, configurations, schematics, systems, and/or methods are disclosed and described, it is to be understood that unless otherwise indicated this invention is not limited to specific compounds, components, compositions, devices, softwares, hardwares, equipments, configurations, schematics, systems, methods, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

For the sake of brevity, the definitions and/or other information provided in the BACKGROUND and SUMMARY will not be repeated but are hereby incorporated into the DETAILED DESCRIPTION where applicable.

An example of a polymerization reactor system whose operation may be monitored and optionally also controlled will be described with reference to FIG. 1. The FIG. 1 system includes fluidized bed polymerization reactor 4. Reactor 4 has a top expanded (or "dome") section which is composed of a cylindrical transition section and a hemispherical top head of the reactor, a distributor plate 10, a cylindrical (straight) section between plate 10 and the top expanded section, a gas inlet line 11, and a bottom section between gas inlet line 11 and distributor plate 10. A fluidized bed 1 of granular polymer and catalyst particles is contained within the straight section. The bed is fluidized by a steady flow of recycle gas from inlet line 11 through distributor plate 10. Bubbles 1A move through bed 1 during typical polymerization operation. The flow rate of fluidizing gas is regulated to provide the fluidized bed with relatively good mixing, as illustrated in the figure.

The reactor system also has a catalyst feeder (not shown) for controlled addition of polymerization catalyst to the fluidized bed reaction zone. Within the reaction zone (i.e. the fluidized bed), the catalyst particles react with the ethylene, comonomer, and optionally hydrogen and other reaction gases to produce granular polymer particles. As new polymer particles are produced, other polymer particles are continually withdrawn from the fluidized bed through a product discharge system 20. After passing through the product discharge system, the polymer granules are degassed (or "purged") with a flow of inert nitrogen to remove substantially all of the dissolved hydrocarbon materials.

Figure 1:
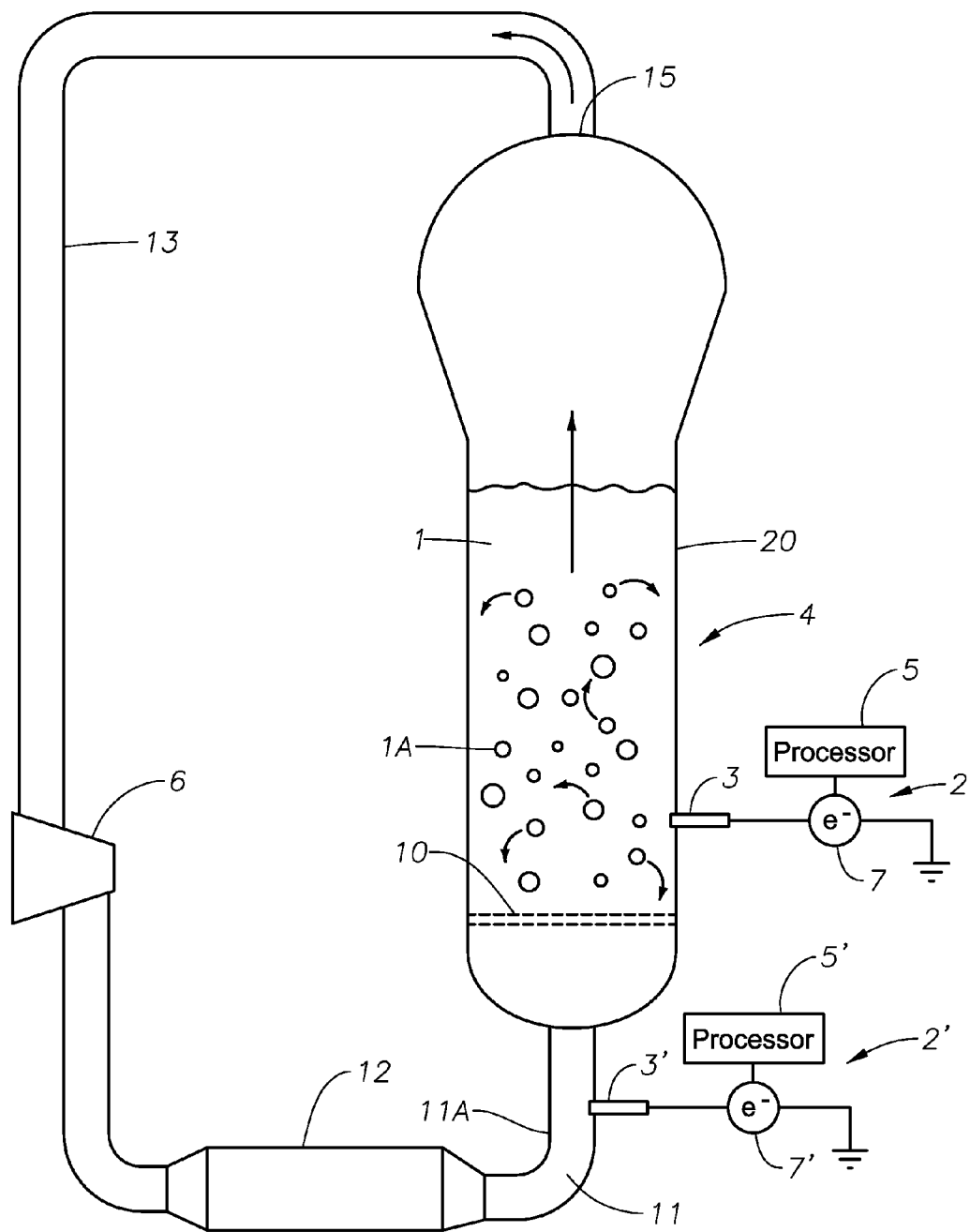
FIG. 1 is a simplified cross-sectional view of a reaction system, including fluidized bed reactor 4, with static probe assembly 2 mounted for monitoring a coated bed wall of reactor 4, and static probe assembly 2' mounted for monitoring a coated cycle gas line 11 in accordance with several embodiments of the invention.

The reactor system of FIG. 1 also has a cooling control loop which includes a recycle gas line 13, compressor 6, and cycle gas cooler 12, coupled with reactor 4 as shown. During operation, the cooled circulating gas from cooler 12 (which may contain condensed liquid) flows through inlet line 11 into reactor 4, then propagates upward through the bed and out from reactor 4 via outlet 15. The cooler 12 is preferably positioned downstream of compressor 6 (as shown in FIG. 1), but in some embodiments may be positioned upstream of compressor 6.

The expanded section is also known as the "velocity reduction zone" or "disengagement zone", and is designed to minimize the quantities of particle entrainment from the fluidized bed. The diameter of each horizontal cross-section of the expanded section is greater than the diameter of the straight section. The increased diameter causes a reduction in the speed of the fluidizing gas, which allows most of the entrained resin particles to settle back into the fluidized bed, thereby minimizing the quantities of solid particles that are entrained (or "carried over") from the fluidized bed (at a given value of fluidizing gas velocity) through recycle gas line 13.

One or more static probe assemblies 2 (each including a probe 3) are positioned for monitoring a coating 21 (shown in FIG. 2 but not FIG. 1) on the bed wall 20 of reactor 4. Bed wall 20 is the portion of reactor 4's inner wall exposed to fluid bed 1 during a polymerization reaction. Coating 21 is typically a polymer coating preformed (e.g., by a chromocene treatment) on bed wall 20 and on probe 3's distal portion (tip) prior to normal polymerization operation of the reactor system. Each probe 3 has a distal portion protruding slightly into fluid bed 1, or flush with bed wall 20 of reactor 4 but exposed to fluid bed 1. Only one static probe assembly 2 is shown for simplicity, but others may be mounted at other locations on bed wall 20.

Each of one or more static probe assemblies 2' (each including a probe 3') is positioned for monitoring a coating on an entrainment zone surface of the FIG. 1 system. One such assembly 2' is shown in FIG. 1 with the distal portion of its probe 3' flush with the wall of inlet line 11 and exposed to fluid flowing through line 11. Alternatively, probe 3' has a distal portion protruding slightly into the interior of line 11. A thin film 11A that coats the inner surface of line 11 also coats on a distal portion of probe 3'. Coating 11A on line 11 (and on the distal portion of probe 3') is exposed to fluid flow through line 11. Only one static probe assembly 2' is shown for simplicity, but others may be mounted at other locations in the entrainment zone of the FIG. 1 system.

Other sensors, e.g., bed temperature sensors, are typically located in the fluidized bed, and are used with a control system (not shown in FIG. 1) and an external cooling loop coupled to the heat exchanger 12 to control the fluidized bed temperature Trx near the process set-point. Relatively warm reactor gas (which obtains a temperature substantially equal to that of the fluidized bed during its flow through reactor 4) is withdrawn from outlet 15 and is pumped by compressor 6 to cooler 12, wherein the temperature of the gas (the cooling fluid) is reduced. Relatively cool fluid (which may contain condensed liquid) flows out from cooler 12 to the reactor inlet to cool the fluidized bed. Temperature sensors (not shown) near the inlet and outlet of cooler 12 provide feedback to the control system regulate the amount by which cooler 12 reduces the temperature of the fluid entering reactor.

The FIG. 1 system may also include a number of skin temperature sensors (typically implemented as thermocouple sensors having fast response design), mounted in positions along the straight section of the reactor wall (and optionally also the conical portion of the expanded section) so as to protrude from the wall a short distance into the reactor (e.g., 3 to 12 mm) These sensors are configured and positioned to sense the temperature $T_w$ of the resin and/or reactor gas near the wall of reactor 4 during operation.

Other sensors and optionally also other apparatus are typically also employed to measure other reaction parameters during a polymerization reaction. Such other reaction parameters preferably include instantaneous and bed-averaged resin product properties (e.g., melt index and density of the polymer resin product being produced by the FIG. 1 system during a polymerization reaction). Bed-averaged resin product properties are conventionally measured by periodically sampling the resin as it exits the reactor (e.g. once per hour), and performing the appropriate tests in a quality control laboratory. Instantaneous product properties are conventionally determined by calculation methods (known in the art) based on reaction models specific to the particular catalyst in use. The reaction models typically relate gas phase concentration ratios (e.g. the 1-hexene/ethylene molar ratio and the hydrogen/ethylene molar ratio) to the instantaneous density and melt index of the polymer being produced.

Other measured reaction parameters preferably include reactor gas composition, e.g., concentrations (and partial pressures) of all reactant gases and induced condensing agents (ICAs), as well as all inert gases (such as nitrogen, hydrocarbon inerts, etc.) that are present in relevant quantities. The reactor gas composition may be measured with a gas chromatographic system.

It is known how to regulate process variables to control various steady-state reactions performed by the FIG. 1 system (e.g., to control gas phase composition, the concentration of induced condensing agents (ICAs) and, partial pressure of at least one reactant (e.g., ethylene), the type and properties of each catalyst introduced into reactor 4, and to use elements 6 and 12 in the manner described above to control temperature). It is also known how to control a polymerization reaction during a transition by regulating process control variables such that the product (granular polymer resin) has properties compliant with an initial specification set at the start of the transition; the product produced during the transition ceases to comply with the initial specification set at a first time, and the product has properties compliant with a final specification set at the end of the transition.

Figure 2:
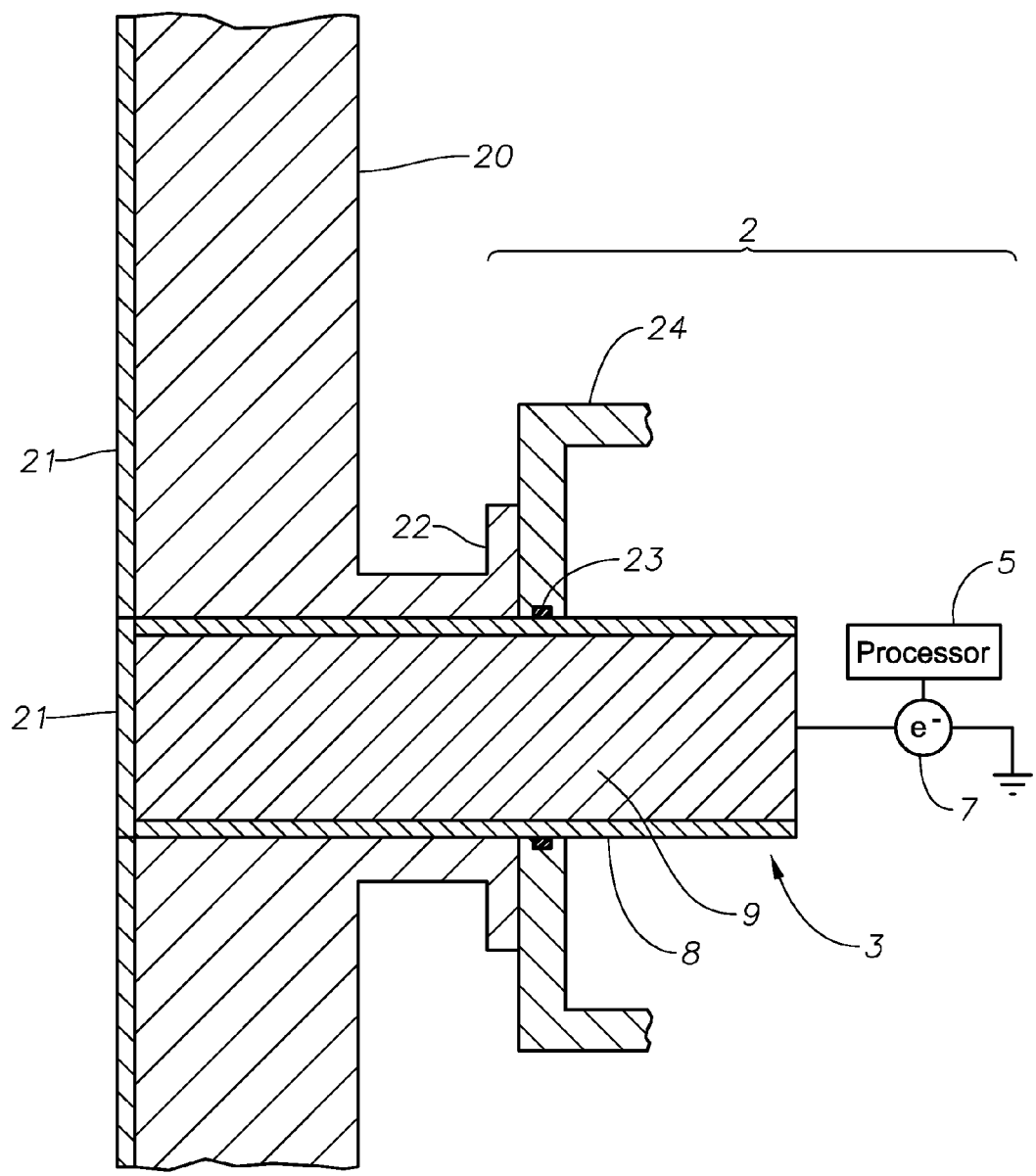
FIG. 2 is a simplified, enlarged cross-sectional view of probe 3 of assembly 2 of FIG. 1 and a portion of bed wall 20 of reactor 4 of FIG. 1, with a block diagram of other elements of assembly 2.

FIG. 2 is a simplified, enlarged view of assembly 2 of FIG. 1. As shown, a thin polymer coating 21 (a thin film) coats bed wall 20 of reactor 4 and the distal surface of probe 3. Generally cylindrical, elongated probe 3 is mounted with its coated distal surface flush with bed wall 20's inner surface (the left surface in FIG. 2) so that probe 3' coated distal surface is exposed to the fluid bed during performance of a reaction. Mounting flange 22 protrudes from the outer surface of wall 20 around the proximal end of the channel (through wall 20) for receiving probe 3. Housing 24 (partially shown) contains the major portion of assembly 2, and fluid seal 23 between housing 24, flange 22, and probe 3 prevents fluid leakage from the fluid bed.

Probe 3 comprises metal rod 9, and electrically insulating material 8 around rod 9's cylindrical side surface. Insulating material 8 prevents direct current flow between rod 9 and conductive (metal) wall 20, flange 22, and housing 24.

Assembly 2 also includes electrometer 7 coupled between probe 3 (and thus probe 3's coated distal surface) and ground. Electrometer 7 (e.g., a current meter or voltmeter) typically has very high resistance and is grounded to wall 20 itself.

Electrometer 7 is used to monitor readings from probe 3. Processor 5 is coupled to electrometer 7 to sample the output of electrometer 7 and perform necessary processing on the sampled data to determine at least one electrical property of coating 21. In typical implementations, electrometer 7 is an instrument or device capable of measuring flow of current induced in probe 3's tip to ground, and may be (for example) an ammeter, picoammeter (a high sensitivity ammeter), or multi-meter. Current induced in probe 3's tip may also be determined indirectly by measuring the voltage generated by the current in passing through a resistor.

Preferably, processor 5 is programmed and otherwise configured to sample the output of electrometer 7 and perform necessary processing on the sampled data to determine at least one electrical property of coating 21 in on-line fashion. Electrical properties determined in on-line fashion are typically available for controlling the reaction without undesirable delay. For example, an electrical parameter determined in on-line fashion may be used to trigger a change in relevant reaction parameters or even to trigger reactor shut down (e.g., to avoid an otherwise imminent condition of excessive resin stickiness in the reactor).

Elements 3', 5', and 7' of probe assembly 2' of FIG. 1 correspond (and can be identical) to elements 3, 5, and 7 of probe assembly 2. Assembly 2' can be implemented to be identical to assembly 2, but is mounted with the coated distal surface of probe 3' flush with the coated inner surface of line 11 (rather than with the coated inner surface of bed wall 20 as is probe 3 of assembly 2).

In accordance with an aspect of the invention, properties of a coating on a bed wall (e.g., polymer film 21 on bed wall 20 of FIG. 1) of a fluid bed polymerization reactor system, or a coating on an entrainment zone surface of a fluid bed polymerization reactor system (e.g., coating 11A on line 11 of the FIG. 1 system), can be determined using fast data acquisition and analysis methods. The inventors have recognized that a high frequency static signal (e.g., static data generated by sampling the output of a static probe with a sampling frequency of 100 Hz) is dominated by electrical induction when a gas bubble in the fluid bed passes by the static probe. The gas bubble constitutes an absence of electrical charge passing by the probe and induces currents in the probe via Gauss's law. The characteristic frequencies of the static pulses are lower than those of the high speed data generated (using at least one static probe) and employed to monitor bed wall coating properties. The characteristic frequencies of the static pulses induced by bubble transits are in a range (sometimes referred to herein as a "bubbling frequency range") that is typically relatively low (e.g., from about 2 Hz to about 6 Hz, or from 1 Hz to about 10 Hz during operation of a fluid bed polyethylene polymerization reactor). High speed data generated for use in characterizing a bed wall coating should have frequency components in the bubbling frequency range. For example, high speed data generated by sampling the output of a static probe with a sampling frequency at least twice the maximum frequency of the bubbling frequency range (e.g., a sampling frequency of 100 Hz, where the bubbling frequency range is from 2 Hz to 6 Hz) has frequency components in the bubbling frequency range.

The high speed alternating current signal produced by a static probe due to bubbling in the fluid bed is determined by factors including bubble size and bubble velocity, as well as average electrical charge on the polymer resin in the vicinity of the probe. In typical embodiments in which the polymerization reaction proceeds with operating conditions in the narrow range typical in a commercial reactor, it is assumed that variations in average bubble size and average bubble velocity are negligible. Having made this assumption, useful results are obtained.

Ohm's law is perhaps the simplest description of electrical properties of a material and is a starting point for understanding bed wall film properties. A simple conductor is said to obey Ohm's law if current through the conductor increases linearly with voltage across the conductor. Semiconductors and insulators do not obey Ohm's law.

A useful method for determining electrical properties of a coating on the bed wall of a polymerization reactor is to determine (from high speed data generated using at least one static probe) the following two quantities, at each of a sequence of times (e.g., in each of a sequence of time windows) during a polymerization reaction in the reactor:

electrical potential in the fluid bed (since this quantity is typically determined as the voltage between a coated distal portion of the probe and ground, the quantity will be referred to sometimes herein as "bed voltage"); and current through the coated distal portion of the probe from the bed to ground (e.g., average current induced in the probe by charge in the fluid bed, in the relevant time window, drawn through the coated distal portion of the probe to ground).

The bed voltage values can be determined from measured high speed data in any of a variety of different ways described herein (e.g., from standard deviation values, covariance values, or cross correlated values determined from the high speed data, or from average power drawn by the probe in the relevant frequency range as determined from the high speed data using Fourier or wavelet methods or another method resulting in a measure of noise).

Figure 3:
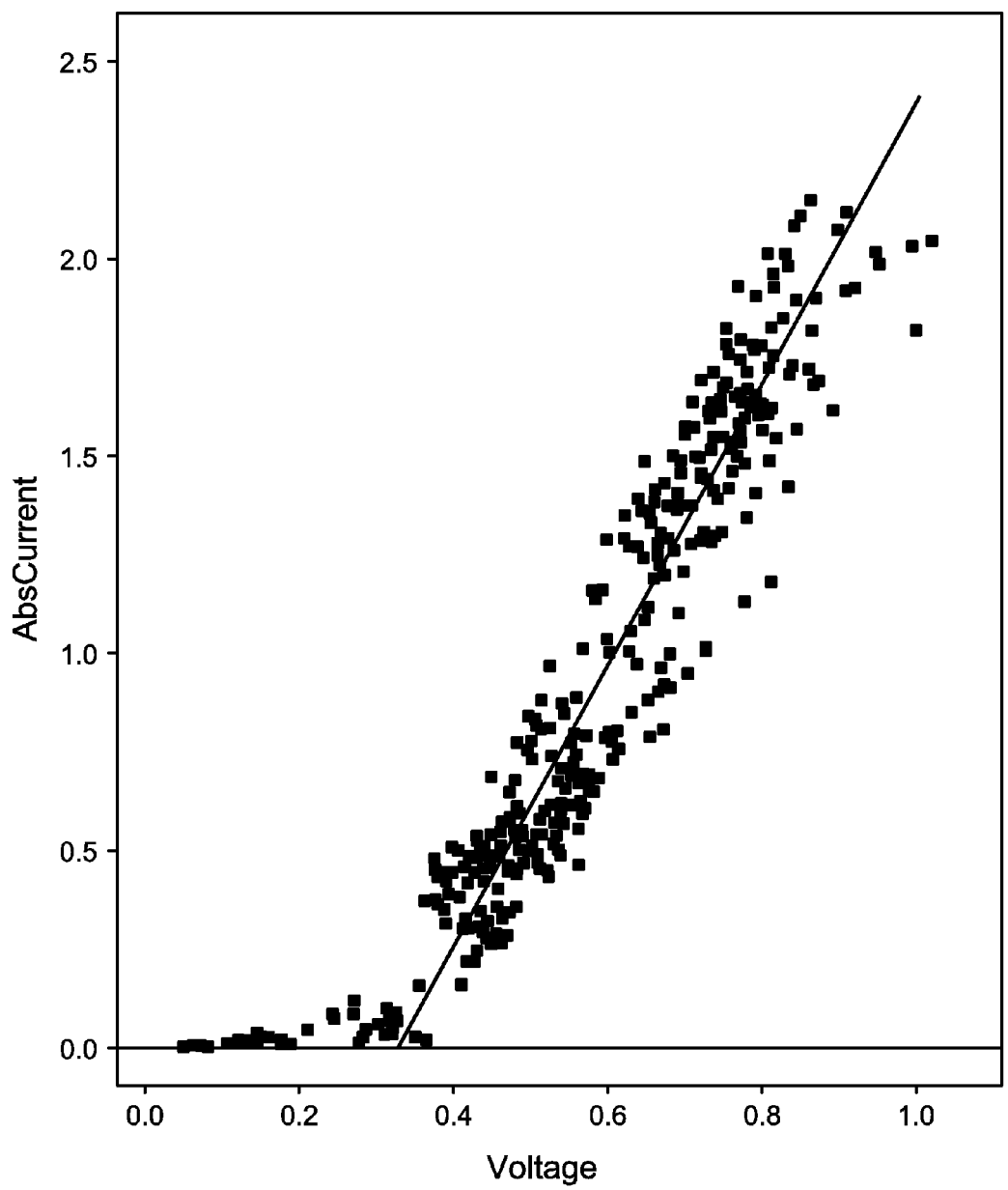
FIG. 3 is a graph of data generated by static probe assembly 2 of FIG. 1 during monitoring of the bed wall of reactor 4 in accordance with several embodiments of the invention.

The bed voltage values can be plotted versus the current values. FIG. 3 is an example of such a plot, in which each plotted point represents bed voltage and induced probe current during a different one of a sequence of time windows during a polymerization reaction. More specifically, the position of each plotted point along the vertical axis represents average current induced in the probe (e.g., probe 3 of FIGS. 1 and 2) by charge in the fluid bed, in the relevant time window. The current is drawn through the coated distal portion of the probe from the fluid bed to ground, measured (e.g., by electrometer 7 of FIG. 2), sampled and averaged in appropriate time intervals (e.g., by processor 5 of FIG. 2) and is plotted (in FIG. 3) in arbitrary units. The position of each plotted point along the horizontal axis of FIG. 3 represents average bed voltage during the relevant time window, and is in arbitrary units.

FIG. 3 shows a curve fitted to the plotted points. As apparent from FIG. 3, there is a bed voltage (referred to herein as a "breakdown voltage" of the coating on the probe's distal portion and the bed wall) above which the curve is linear (with positive slope). The breakdown voltage is at about 0.33 units of bed voltage in FIG. 3. In the bed voltage regime above the breakdown voltage, the bed wall coating has the electrical properties of a conductor (it obeys Ohm's law). In the bed voltage regime below the breakdown voltage, the bed wall coating has the electrical properties of an insulator (it does not obey Ohm's law).

Over weeks, months, and years of reactor operation, the breakdown voltage and conductivity after breakdown of a bed wall coating will typically evolve. For example, breakdown voltage has been observed to increase after polymerization producing high MI polyethylene grades using a metallocene catalyst. We have also observed evolution of wall film layers in the "entrainment zones" of reactors (e.g., film layers on surfaces of cycle gas lines) which change very slowly (e.g., over days and weeks), probably due to low levels of scrubbing by passing particles.

In a class of embodiments, the invention is a method for using at least one static probe (e.g., probe 3 or probe 3' of FIG. 1) during performance of a polymerization reaction in a fluid bed polymerization reactor system (sometimes referred to herein as a "reactor" for convenience), to monitor a coating on a surface of the reactor system and a distal portion of each static probe, where the coating is exposed to flowing fluid within the reactor system during performance of the method. Typically, the surface is a bed wall of the reactor (e.g., bed wall 20 of FIG. 2) exposed to the reactor's fluid bed, and the coating (e.g., coating 21 of FIG. 2) is exposed to flowing (e.g., bubbling) fluid within the fluid bed during the reaction. Typically, each static probe is an external probe mounted (e.g., directly to the reactor) with its distal portion flush with the reactor bed wall or extending slightly into the fluid bed from the bed wall. Typically, the coating is a thin film of polymer (e.g., having thickness in a range from about 0.025 to 0.50 millimeters) that has been precoated on the bed wall and distal portion of each probe prior to performance of the reaction. In embodiments in which the coating to be monitored (e.g., coating 21 of FIG. 2) is on the reactor bed wall (e.g., bed wall 20 of FIG. 2) and on a distal portion of each static probe (e.g., the distal surface of probe 3 of FIG. 2), the method includes the steps of:

(a) during a first interval of time during performance of the reaction in the reactor, operating the static probe to generate a sequence of data values (sometimes referred to herein as "high speed data") indicative of bubbling in the fluid bed. The high speed data typically include frequency components in a range ("bubbling frequency range") from about 1 Hz to about 10 Hz, or from about 2 Hz to about 6 Hz, and the duration of the first interval is typically several minutes; and (b) determining from the high speed data at least one electrical property of the coating (e.g., at least one electrical property of a portion of the coating on the distal portion of the static probe).

The bubbling frequency range (for each static probe) is the range of frequencies of an electrical signal induced in the static probe by movement of bubbles in the fluid bed relative to the static probe. In some embodiments, the bubbling frequency range has been independently determined (e.g., determined to be the bandwidth of bed DP readings generated during the reaction or a polymerization reaction similar thereto, where each bed DP reading is a measured instantaneous pressure difference between the bottom and top of the fluid bed), and each said electrical property of the coating is generated in step (b) from frequency components of the high speed data in a range that coincides with or includes the independently determined bubbling frequency range. In some embodiments, the high speed data are generated by sampling the output of each static probe with a sampling frequency of at least 100 Hz.

In some embodiments, at least one electrical property determined in step (b) is a breakdown voltage of the coating. In some embodiments, the method also includes the step of:

(c) determining from at least one electrical property determined in step (b) at least one of a degree of deterioration of the coating and a degree of contamination of the coating. For example, step (c) can include the step of determining a degree of deterioration of the coating from a determined breakdown voltage of the coating on the distal portion of the static probe.

In some embodiments, steps (a) and (b) (or all of steps (a), (b), and (c)) are performed in on-line fashion during the reaction.

In some embodiments, the first interval of time includes a set of subintervals, and step (b) includes the steps of:

determining standard deviation values, by determining for each subinterval in the set of subintervals, from the high speed data generated in said each subinterval of the first interval, the standard deviation of the high speed data generated in the subinterval; and determining electrical potential in the fluid bed during said each subinterval of the first interval from the high speed data and the standard deviation values. For example, processor 5 of FIG. 2 is programmed to determine such standard deviation values from the sampled output of electrometer 7 and to determine the electrical potential in the fluid bed from such standard deviation values and sampled output data.

In other embodiments, the first interval of time includes a set of subintervals, the high speed data are indicative of average power drawn by the probe (due to current induced in the probe by charge in the fluid bed) during said each subinterval of the first interval, and step (b) includes the step of:

determining electrical potential in the fluid bed during said each subinterval of the first interval from the high speed data. For example, processor 5 of FIG. 2 is programmed to determine such average power values from the sampled output of electrometer 7 and to determine the electrical potential in the fluid bed from such values and sampled output data. In some embodiments, Fourier or wavelet methods are used, or another method resulting in a measure of noise is used, to determine the average power drawn by the probe in the relevant frequency range.

In some embodiments, the first interval of time includes a set of subintervals, and step (b) includes the steps of generating averaged data values from the high speed data by averaging, for each subinterval in the set of subintervals the high speed data generated in said each subinterval, and determining from the averaged data values and the high speed data at least one said electrical property of the coating.

In another class of embodiments, the first interval of time includes a set of subintervals, and step (b) includes the steps of:

determining cross correlated (e.g., autocorrelated) values, by determining for said each subinterval of the first interval, a cross correlation of the high speed data generated in the subinterval with one of said high speed data generated in the subinterval and a processed version of said high speed data generated in the subinterval; and determining electrical potential in the fluid bed during said each subinterval of the first interval from the high speed data and the cross correlated values. For example, processor 5 of FIG. 2 is programmed to determine such cross correlated values from the sampled output of electrometer 7 and to determine the electrical potential in the fluid bed from such cross correlated values and sampled output data.

In some embodiments in the latter class, cross correlation calculations are performed using the function "xcorr" in the commercially available Matlab software (available from The MathWorks). Alternatively, the cross correlation calculations are performed on a computer or other processing system (e.g., processor 5 of FIG. 2) programmed in another appropriate manner. To calculate the cross correlation of vectors x and y (of equal size) using the Matlab software, the command "output=xcorr(x,y)" is executed in the Matlab environment. Autocorrelation of vector x with itself is performed as a special case, using the command "output=xcorr(x)".

For example, high speed static data are collected for five minutes during performance of a polymerization reaction by operating processor 5 (of FIG. 2) to sample the output of electrometer 7 (of the static probe assembly of FIG. 2) with a sampling frequency of 100 Hz, thus producing a vector of 30,000 data values. Cross correlation is performed as follows to determine voltage between the probe's coated distal portion and ground (which is taken as a measure of electrical potential in the fluid bed):

(i) zero offsets and baseline drift are removed from the data values (e.g., using the "detrend" function of the Matlab software) to determine a detrended vector;

(ii) the absolute values of the data values of the detrended vector are determined, thus determining an absolute valued vector;

(iii) the detrended vector and the absolute valued vector are cross-correlated, thereby determining a cross correlation vector.

The cross correlation vector is indicative of movement of bubbles in the fluid bed past the probe. For example, when the data values of the cross correlation vector are plotted (as voltages versus time), and "displacement voltages" indicated by the data values are determined, where each such "displacement voltage" consists of a peak (maximum) voltage followed with a lag time (in the range of 0.5 to 2 seconds) by a minimum voltage, or a minimum voltage followed (with a lag time in the same range) by a maximum voltage. This lag time range is for a typical polymerization reaction with typical superficial gas velocity. In general, the appropriate lag time range depends on the superficial gas velocity in the reactor.

Covariance is a well known parameter related to cross-correlation. Covariance values rather than cross correlated values are determined in some embodiments of the invention. Thus, in some embodiments, the first interval of time includes a set of subintervals, and step (b) includes the steps of:

determining covariance values, by determining for said each subinterval of the first interval, covariance of the high speed data generated in the subinterval with one of said high speed data generated in the subinterval and a processed version of said high speed data generated in the subinterval; and determining electrical potential in the fluid bed during said each subinterval of the first interval from the high speed data and the covariance values.

A relative measure of bed static (voltage between the probe's coated distal portion and ground) is determined from the displacement voltages as follows. From each displacement voltage, a relative measure of the voltage between the probe's coated distal portion and ground at the time of occurrence of the displacement voltage (e.g., the time of occurrence of the leading voltage extremum) is the magnitude of the leading voltage extremum (max or min) of the displacement voltage minus the magnitude of the lagging voltage extremum (max or min) This method is especially useful because the sign of the average resin charge is retained.

Static measurements performed (e.g., those described in the foregoing example) will typically depend on both average bed static and fluidization (bubble size and velocity, and bed non-uniformities). Experience has shown that fluidization behavior is reproducible in the lower section of a typical polymerization reactor bed, given the narrow range of gas velocities employed commercially and proximity to the distributor plate (which controls bubble formation), to typically determine accurately a relative measure of electrical potential in the lower section of such a fluid bed. Fluidization in the upper bed may be more variable and strongly dependent on coalescence of small bubbles to form large, fast bubbles. Thus, determination of a relative measure of electrical potential in the upper section of a fluid bed may be subject to greater uncertainty due to fluidization effects than electrical potential in the upper section of a fluid bed.

In typical embodiments, the method includes the step of performing repetitions of steps (a) and (b) sequentially, each performance of step (a) during a different time interval. For example, in some such embodiments the method also includes the steps of:

(c) after step (a) but during a second interval of time during performance of the reaction in the reactor, operating the static probe to generate an additional sequence of data values (referred to herein as "additional high speed data") indicative of bubbling in the fluid bed;

(d) determining from the additional high speed data at least one electrical property of the coating; and (e) in response to the electrical properties determined during steps (b) and (d), monitoring at least one of deterioration and contamination of the coating over time.

In some embodiments, the first interval of time includes a set of subintervals, the second interval of time includes a second set of subintervals, step (b) includes the steps of generating averaged data values from the high speed data by averaging, for each subinterval in the set of subintervals, the high speed data generated in said each subinterval, and determining from the averaged data values and the high speed data at least one said electrical property of the coating, and step (d) includes the steps of generating additional averaged data values from the additional high speed data by averaging, for each subinterval in the second set of subintervals, the additional high speed data generated in said each subinterval, and determining from the additional averaged data values and the additional high speed data at least one said electrical property of the coating.

Another aspect of the invention is a bifunctional static probe configured for use in monitoring a polymerization reaction in a fluid bed reactor. A typical embodiment of such a probe, bifunctional static probe 40, will be described with reference to FIGS. 4 and 5.

Figure 4:
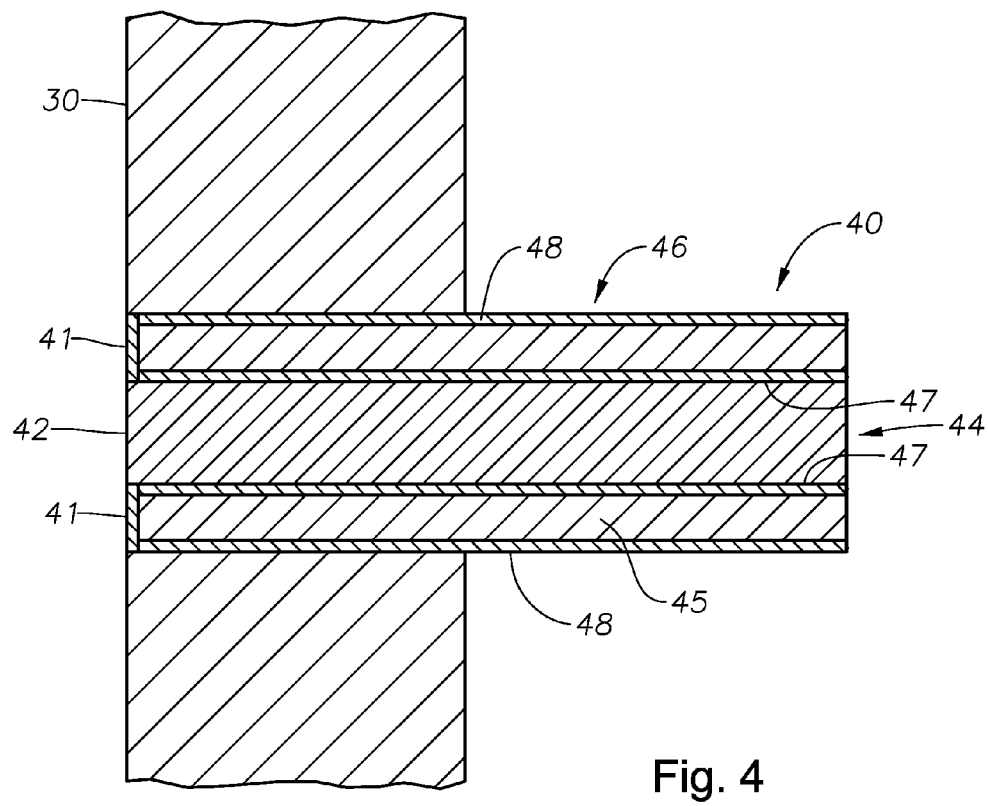
FIG. 4 is simplified, side cross-sectional view of a portion of an embodiment of the inventive bifunctional static probe mounted to the bed wall of a reactor.

As shown in FIG. 4, probe 40 includes:

an insulated probe 46 having an electrically insulating distal portion 41 configured to be exposed during use to flowing fluid within the reactor (with insulating distal portion 41's distal surface at least substantially flush with the reactor's bed wall 30) and a conductive proximal portion 45 in contact with distal portion 41; and an electrically conducting bare probe 44, positioned coaxially with the insulated probe and having an electrically conducting distal surface 42 configured to be exposed during use to the flowing fluid within the reactor (e.g., with the conducting distal surface at least substantially flush with the reactor's bed wall 30).

Alternatively, the distal portions of the insulated and conducting probes can extend slightly into the fluid flow from a reactor surface (typically, the bifunctional probe is mounted to a reactor element at or near to this surface).

Bare probe 44 (of FIGS. 4 and 5) is substantially cylindrical, insulated probe 46 is substantially annular, and distal surface 42 of bare probe 44 is aligned with the annular distal surface of probe 46's insulating distal portion 41. Bare probe 44 has a generally cylindrical outer side surface. Insulated probe 46 has a generally cylindrical, inner side surface coated with an electrically insulating layer 47. When probe 40 is assembled, layer 47 faces bare probe 44 and insulates probe 44 from insulated probe 46. Insulated probe 46's outer side surface is coated with an electrically insulating layer 48. When probe 40 is assembled and mounted to the reactor bed wall 30, layer 48 faces wall 30 and insulates probe 40 therefrom.

Figure 5:
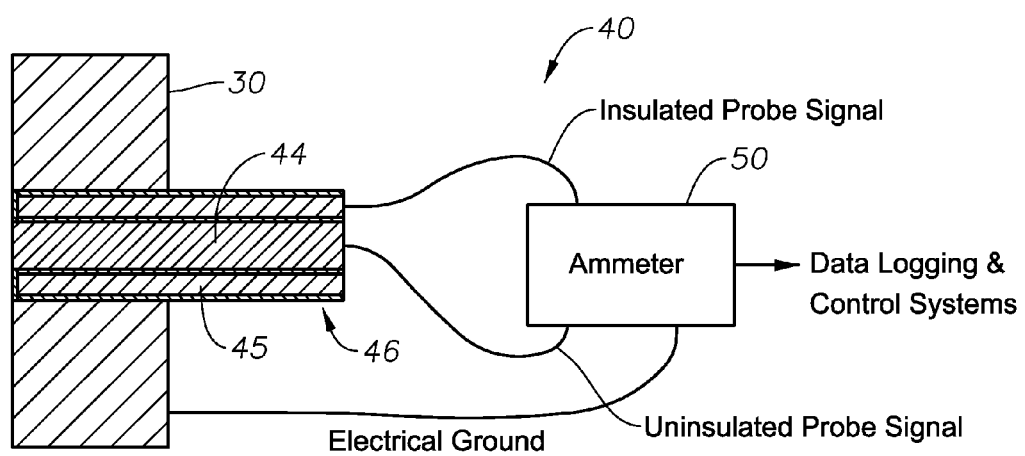
FIG. 5 is a reduced, simplified version of FIG. 4 with a block diagram of additional elements of the bifunctional static probe.

As shown in FIG. 5, bifunctional static probe 40 also includes readout circuitry 50 coupled to the conductive proximal portion 45 of insulated probe 46 and to bare probe 44. Circuitry 50 is configured to assert a bare probe output (indicative of at least one of current through bare probe 44 and voltage across bare probe 44) and an insulated probe output (indicative of at least one of current through insulated probe 46 and voltage across probe 46), e.g., to data logging and control systems. Circuitry 50 is preferably configured to assert the bare probe output simultaneously with the insulated probe output. Alternatively, circuitry 50 is configured to assert the bare probe output and the insulated probe output sequentially (e.g., in time division multiplexed fashion). In the FIG. 5 embodiment, readout circuitry 50 is an ammeter connected between ground (bed wall 30) and probes 44 and 46. More generally, the readout circuitry of the inventive bifunctional probe may be or include an electrometer (e.g., a current meter or voltmeter) coupled to the conductive proximal portion of the insulated probe and to the bare probe. Typically, the readout circuitry is coupled during use between the conductive proximal portion of the insulated probe and ground, and between the bare probe and ground. The readout circuitry should present a very high resistance to the bifunctional probe to prevent drainage of sufficient charge to impact the sensing element and the very processes which the probe is designed to measure. The readout circuitry's output (preferably a voltage across a very large resistor) is preferably asserted to a transmitter via a shielded coax cable. Transmitted signals from both the insulated and bare probes of the inventive bifunctional probe can be asserted to control system computers for logging, analysis and control action (e.g., to manipulate flow of continuity aid).

Bifunctional probe 40 is capable of measuring (preferably simultaneously) direct current flow from the fluid bed of a reactor to distal surface 42 of bare probe 44, and inductive current flow from the bed to insulated probe 46 (without direct contact between the bed and a conductive element of probe 46). Measuring both these effects simultaneously (or substantially simultaneously) at the same location in the bed can provide information critical for characterizing the state of charge in the bed, the mechanism of charge generation, fluidization (via capacitance measurements), and the state of wall coatings (e.g., deposition, replenishment, deterioration, and contamination of a polymer or wax coating on a bare conductive distal surface of the probe, using readings from an insulated distal surface of the probe as reference).

Since both the bare probe (e.g., probe 44 of FIG. 5) and insulated probe (e.g., probe 46 of FIG. 5) should measure the same locale in the reactor system (e.g., in the reactor's fluid bed), they preferably are mounted coaxially with respect to each other (as in the embodiment of FIGS. 4 and 5). When the inventive bifunctional probe is used to monitor the fluid bed (or a coating on the bed wall and a distal surface of the insulated probe and bare probe thereof) the distal surfaces of the bifunctional probe's insulated probe and bare probe should be smaller than the typical bubble size in the fluid bed.

The composition of electrically insulating distal portion 41 (of insulated probe 46) may influence the contact charging measurements determined using bare probe 44. In some cases it will be desirable to eliminate or minimize this influence; in other cases the influence may be desirable. Thus, it may be desirable in some applications for distal portion 41 to be composed of material that is triboelectrically matched to material expected to come into contact with it during use (e.g., polymer being produced in the fluid bed) to eliminate or minimize triboelectric charging of materials contacting distal portion 41 during operation of probe 44 and/or probe 46. Alternatively, it may be desirable in other applications to form distal portion 41 of material that is triboelectrically dissimilar to material (e.g., polymer being produced in the fluid bed) expected to come into contact with portion 41 during operation, to allow a useful amount of triboelectric charging of materials contacting distal portion 41 during operation of probe 44 and/or probe 46.

For example, when probes 44 and 46 are expected to operate during production of polyethylene ("PE") within a fluid bed reactor (e.g., the reactor whose wall 30 is shown in FIG. 4), it may be desirable to form distal portion 41 of insulating material that is triboelectrically dissimilar to the PE particles that will come into contact with it during operation. This would allow distal portion 41 to contact-charge some of the PE particles that contact it during operation, so that a portion of the resulting charge would dissipate through bare probe 44, possibly allowing the output of probe 44 to provide useful information not attainable if distal portion 41 were triboelectrically matched to the PE particles.

To normalize signal strength, the cross-sectional areas of the conductive elements of both the bare probe (e.g., probe 44 of FIG. 5) and insulated probe (e.g., probe 46 of FIG. 5) of the inventive bifunctional probe may be identical. The insulated probe is preferably ruggedized to ensure that its insulating distal portion will not be removed or abraded by years of contact reactor system fluid (e.g., the contents of a fluidized bed). The inventive bifunctional probe will likely need to be removed from service during wall cleaning operations (such as sandblasting) to prevent damage to the insulating distal portion of its insulating probe.

Typical embodiments of the bifunctional probe are useful by plant personnel to compare readings of a type generated by a traditional (non-insulated) static probe with readings generated by an insulated static probe, e.g., in order to verify the condition of a thin coating on a reactor wall (and on a distal portion of each of the non-insulated and insulated probes). For example, probe assembly 2 (and/or probe assembly 2') of FIG. 1 can be implemented as a bifunctional probe (e.g., of the type shown in FIG. 5) and employed to perform any of the inventive monitoring methods described herein.

Typical embodiments of the bifunctional probe can be used to monitor plant events which impact a bed wall coating. Different polymer grades and different catalysts may remove or deposit polymer on reactor surfaces (including surfaces of static probes that are exposed to the fluid bed), leading to an evolution of wall condition. Accordingly, static generation and dissipation will evolve. It is expected that a more complete and detailed understanding of wall condition (e.g., via on-line monitoring) may lead to better methods for wall management, and may delay or eliminate the need for chromocene treatment.

More fundamentally, at least some embodiments of the inventive bifunctional probe can be used by technologists to decouple inductive and charge-transfer measurements, thereby providing a clearer understanding of static charge and the mechanisms of static charge generation and dissipation, free of the static noise caused by local variations in bed capacitance due to fluidization and bubbling. It is expected that this understanding will bring clearer focus on static control technologies such as continuity aids and antistats. A second benefit is the clearer understanding of fluidization and bubbling in the fluid bed.

Any of a variety of signal processing techniques may be employed to process the output of the inventive bifunctional static probe. For example, embodiments of the inventive method (described herein) can employ the bifunctional probe to generate high speed data indicative of bubbling in a fluid bed, and determine from the high speed data at least one electrical property of a coating on a reactor wall and a distal portion of the probe (e.g., an electrical property of a portion of the coating on the bare probe and the insulated probe of the bifunctional probe). In some cases, frequency analysis may be employed to extract (from the output of the bifunctional probe) the component of induction due to variations in local capacitance due to passage of bubbles. In other cases, wavelet methods and/or short-term Fourier methods for analysis of asynchronous signals may be used to extract a relative measure of bubbling-related charge density from the bifunctional probe's output. The absence of bubbling may indicate poor fluidization (similar to cold-banding) which may be a precursor to sheeting.

As noted, in some embodiments of the inventive method the coating to be monitored is not on a reactor bed wall. Instead the coating is on another surface of a fluid bed reactor system (and on a distal portion of each static probe employed during the monitoring) exposed to flowing fluid during the reaction. For example, the coating may be on a surface in the entrainment zone of the reaction system (e.g., the coating is coating 11A on the inner surface of line 11 of the FIG. 1 system) and the monitoring may employ at least one static probe positioned in the entrainment zone to monitor carry-over static (e.g., probe 3' of probe assembly 2' of FIG. 1). In this context, the expression "entrainment zone" of a fluidized bed reactor system denotes any location in fluid bed polymerization reactor system outside the dense phase zone of the system (i.e., outside the fluid bed), and the expression "carryover static" denote static charging that results from frictional contact by particles (e.g., catalyst particles and resin particles) in the entrainment zone (e.g., against metal walls of the gas recycle line or against another component of the entrainment zone). In this class of embodiments, the invention is a method for using at least one static probe during performance of a polymerization reaction in a fluid bed polymerization reactor, to monitor a coating on an element of the entrainment zone of the reactor and a distal portion of each static probe. Typically, each static probe is an external probe mounted with its distal portion flush with the relevant entrainment zone element or extending slightly into the fluid flow from such element.

In a broader class of embodiments, the inventive method is a method for using at least one static probe during performance of a polymerization reaction in a fluid bed polymerization reactor system (sometimes referred to herein as a "reactor"), to monitor a coating on a surface of the reactor system (e.g., the reactor's bed wall or a surface of the reactor's entrainment zone) and a distal portion of each static probe, where the coating is exposed to flowing fluid within the reactor system during performance of the method. In this class of embodiments, the method includes the steps of:

(a) during performance of the reaction in the reactor, operating the static probe to generate a sequence of data values (sometimes referred to herein as "high speed data") indicative of fluid flow variation (e.g., bubbling or turbulence) during a first interval of time; and (b) determining from the high speed data at least one electrical property of the coating (e.g., of a portion of the coating on the distal portion of the static probe).

Any of the techniques described herein for determining an electrical property of a bed wall coating from high speed data may be employed to determine an electrical property of a coating (e.g., on an entrainment zone component) other than a bed wall coating, from the high speed data determined in this broader class of embodiments.

For example, in the broader class of embodiments, the high speed data may include frequency components in a range from about 1 Hz to about 10 Hz, or from about 2 Hz to about 6 Hz, and the duration of the first interval is much longer than the inverse of the lowest of these frequency components. For example, the first interval may be at least one minute (e.g., several minutes) if the lowest frequency component of interest in the high speed data is 1 Hz. The frequency range of interest (for each static probe) is the range of frequencies of an electrical signal induced in the static probe by the fluid flow variation relative to the static probe during the reaction.

In some embodiments in the noted broader class, at least one electrical property determined in step (b) is a breakdown voltage of the coating. In some embodiments in the broader class, the method also includes the step of:

(c) determining from at least one electrical property determined in step (b) at least one of a degree of deterioration of the coating and a degree of contamination of the coating. For example, step (c) can include the step of determining a degree of deterioration of the coating from a determined breakdown voltage of the coating on the distal portion of the static probe. In some embodiments in the noted broader class, steps (a) and (b) (or all of steps (a), (b), and (c)) are performed in on-line fashion during the reaction.

Some embodiments of the inventive method employ the inventive bifunctional probe to generate high speed data. Other embodiments of the inventive method employ other static probes to generate high speed data (e.g., conventional static probes of the type described in U.S. Pat. Nos. 6,008,662 and 6,905,654).

We next describe examples of commercial-scale reactions (e.g., commercial-scale, gas-phase fluidized-bed polymerization reactions) that can be monitored and optionally also controlled. Some such reactions can occur in a reactor having the geometry of reactor 4 of FIG. 1. Performance of any of a variety of different reactors can be monitored in accordance with different embodiments of the invention.

In some embodiments, a continuous gas phase fluidized bed reactor is monitored and optionally also controlled while it operates to perform polymerization as follows; the fluidized bed is made up of polymer granules. Gaseous feed streams of the primary monomer and hydrogen together with liquid or gaseous comonomer are mixed together in a mixing tee arrangement and introduced below the reactor bed into the recycle gas line. For example, the primary monomer is ethylene and the comonomer is 1-hexene. The individual flow rates of ethylene, hydrogen and comonomer are controlled to maintain fixed gas composition targets. The ethylene concentration is controlled to maintain a constant ethylene partial pressure. The hydrogen is controlled to maintain a constant hydrogen to ethylene mole ratio. The hexene is controlled to maintain a constant hexene to ethylene mole ratio (or alternatively, the flow rates of comonomer and ethylene are held at a fixed ratio). The concentration of all gases is measured by an on-line gas chromatograph to ensure relatively constant composition in the recycle gas stream. A solid or liquid catalyst is injected directly into the fluidized bed using purified nitrogen as a carrier. The feed rate of catalyst is adjusted to maintain a constant production rate. The reacting bed of growing polymer particles is maintained in a fluidized state by a continuous flow of make up feed and recycle gas through the reaction zone (i.e. the fluidized bed).

In some implementations, a superficial gas velocity of 2.0 to 2.8 ft/sec is used to achieve this, and the reactor is operated at a total pressure of 300 psig. To maintain a constant reactor temperature, the temperature of the recycle gas is continuously adjusted up or down to accommodate any changes in the rate of heat generation due to the polymerization. The fluidized bed is maintained at a constant height by withdrawing a portion of the bed at a rate equal to the rate of formation of particulate product. The product is removed semi-continuously via a series of valves into a fixed volume chamber, which is simultaneously vented back to the reactor. This allows for efficient removal of the product, while at the same time recycling a large portion of the unreacted gases back to the reactor. This product is purged to remove entrained and dissolved hydrocarbons and treated with a small steam of humidified nitrogen to deactivate any trace quantities of residual catalyst.

In other embodiments, a reactor is monitored and optionally also controlled while it operates to perform polymerization using any of a variety of different processes (e.g., slurry, or gas phase processes). For example, the reactor can be a fluidized bed reactor operating to produce polyolefin polymers by a gas phase polymerization process. This type of reactor and means for operating such a reactor are well known. In operation of such reactors to perform gas phase polymerization processes, the polymerization medium can be mechanically agitated or fluidized by the continuous flow of the gaseous monomer and diluent.

In some embodiments, a polymerization reaction that is a continuous gas phase process (e.g., a fluid bed process) is monitored and optionally also controlled. A fluidized bed reactor for performing such a process typically comprises a reaction zone and a velocity reduction zone (also known as an expanded section). The reaction zone comprises a bed of growing polymer particles, formed polymer particles and a minor amount of catalyst particles fluidized by a continuous flow of reactor gas through the reaction zone. Optionally, some of the recirculated gases may be cooled and compressed to form liquids that increase the heat removal capacity of the circulating gas stream when readmitted to the reaction zone. This method of operation is referred to as "condensed mode." A suitable rate of gas flow may be readily determined by simple experiment. Make up of gaseous monomer, comonomer and hydrogen to the circulating gas stream is at a rate equal to the rate at which particulate polymer product and monomer associated therewith is withdrawn from the reactor, so as to maintain an essentially steady state gaseous composition within the reaction zone. The gas leaving the reaction zone is passed to the velocity reduction zone where entrained particles are removed. Finer entrained particles and dust may be removed in a cyclone and/or fines filter. The gas is compressed in a compressor and passed through a heat exchanger wherein the heat of polymerization is removed, and then returned to the reaction zone.

The reactor temperature (Trx) of the fluid bed process is normally operated at the highest temperature that is feasible, given the stickiness or sintering characteristics of the polymer in the fluid bed to maximize heat removal capabilities.

In other embodiments, a reactor whose operation is monitored and optionally also controlled effects polymerization by a slurry polymerization process. Non-limiting examples of slurry processes include continuous loop or stirred tank processes. A slurry polymerization process generally uses pressures in the range of from 1 to 50 atmospheres, and temperatures in the range of 0° C. to 120° C., and more particularly from 30° C. to 100° C. In a slurry polymerization process, a slurry of solid, particulate polymer is formed in a liquid polymerization diluent medium to which monomer, comonomers, catalyst, and often hydrogen are added. The slurry including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and chemically non-reactive with the catalyst and monomers employed in the reactor system. In some embodiments, a hexane, isopentane or isobutane diluent is employed.

In other embodiments, a reaction monitored and optionally also controlled is or includes particle from polymerization, or a slurry process in which the temperature is kept below the temperature at which a substantial portion of the polymer goes into solution. In some embodiments, a particle form polymerization reaction monitored and optionally also controlled is a slurry loop reactor, in which a circulation pump is employed to circulate the slurry through heat exchanger tubes to remove the heat of polymerization. In the slurry loop embodiment, the temperature and pressure of the slurry polymerization process are preferably operated above the thermodynamic critical point of the diluent to avoid the possibility of cavitation in the slurry circulation pump. In other embodiments, a reaction monitored and optionally also controlled is carried out in a plurality of slurry loop reactors or stirred tank reactors in series, parallel, or combinations thereof.

A reaction monitored and optionally also controlled in accordance with some embodiments of the invention can produce homopolymers of olefins (e.g., homopolymers of ethylene), and/or copolymers, terpolymers, and the like, of olefins, particularly ethylene, and at least one other olefin. The olefins, for example, may contain from 2 to 16 carbon atoms in one embodiment; or ethylene and a comonomer comprising from 3 to 12 carbon atoms in another embodiment; or ethylene and a comonomer comprising from 4 to 10 carbon atoms in yet another embodiment; or ethylene and a comonomer comprising from 4 to 8 carbon atoms in yet another embodiment. A reaction monitored and optionally also controlled produce polyethylene. Such polyethylene can be homopolymers of ethylene and interpolymers of ethylene and at least one $\alpha$-olefin wherein the ethylene content is at least about 50% by weight of the total monomers involved. Exemplary olefins that may be utilized in embodiments of the invention are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In the production of polyethylene or polypropylene, one or more comonomers may be present in the polymerization reactor. When present, the comonomer may be present at any level with the ethylene or propylene monomer that will achieve the desired weight percent incorporation of the comonomer into the finished resin. In one embodiment of polyethylene production, the comonomer is present with ethylene in a mole ratio range in the gas phase of from 0.0001 (comonomer:ethylene) to 50, and from 0.0001 to 5 in another embodiment, and from 0.0005 to 1.0 in yet another embodiment, and from 0.001 to 0.5 in yet another embodiment. Expressed in absolute terms, in making polyethylene, the amount of ethylene present in the polymerization reactor may range to up to 1000 atmospheres pressure in one embodiment, and up to 500 atmospheres pressure in another embodiment, and up to 100 atmospheres pressure in yet another embodiment, and up to 50 atmospheres in yet another embodiment, and up to 10 atmospheres in yet another embodiment.

Hydrogen gas is often used in olefin polymerization to control the final properties of the polyolefin. For some types of catalyst systems, it is known that increasing concentrations (or partial pressures) of hydrogen reduce the molecular weight and increase the melt index (MI) of the polyolefin generated. The MI can thus be influenced by the hydrogen concentration. The amount of hydrogen in the polymerization can be expressed as a mole ratio relative to the dominant polymerizable monomer that is present in the reactor; for example, ethylene or propylene. The amount of hydrogen used in some polymerization processes is an amount necessary to achieve the desired MI (or molecular weight) of the final polyolefin resin. In one embodiment, the mole ratio in the gas phase of hydrogen to total monomer ($H_2$:monomer) is greater than 0.00001. The mole ratio is greater than 0.0005 in another embodiment, greater than 0.001 in yet another embodiment, less than 10 in yet another embodiment, less than 5 in yet another embodiment, less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 10 ppm in one embodiment, or up to 100 or 3000 or 4000 or 5000 ppm in other embodiments, or between 10 ppm and 5000 ppm in yet another embodiment, or between 100 ppm and 2000 ppm in another embodiment.

A reactor monitored and optionally also controlled in accordance with some embodiments of the invention can be an element of a staged reactor employing two or more reactors in series, wherein one reactor may produce, for example, a high molecular weight component and another reactor may produce a low molecular weight component.

A reactor monitored and optionally also controlled may implement a slurry or gas phase process in the presence of a metallocene or metallocene-type catalyst system and in the absence of, or essentially free of, any scavengers, such as triethylaluminum, trimethylaluminum, tri-isobutylaluminum and tri-n-hexylaluminum and diethyl aluminum chloride, diethyl zinc and the like. By "essentially free", it is meant that these compounds are not deliberately added to the reactor or any reactor components, and if present, are present to less than 1 ppm in the reactor.

A reactor monitored may employ one or more catalysts combined with "continuity additives" or other "antistatic agents" to control reactor static, as described in U.S. Patent Application Publication No. 2005/0148742. In some embodiments, the continuity additive is a metal-fatty acid compound (such as aluminum stearate), which is fed to the reactor in amounts up to 50 ppm (based on the polymer production rate. In other embodiments, the continuity additive can be an antistatic agent, such as an ethoxylated or methoxylated amine, an example of which is Kemamine AS-990 (ICI Specialties, Bloomington Del.) (or combinations thereof). Other antistatic compositions include the Octastat family of compounds, more specifically Octastat 2000, 3000, and 5000. Other embodiments may include combinations of metal-fatty acids and antistatic compounds in amounts up to 100 ppm based on the polymer production rate.

In a reactor monitored and optionally also controlled in accordance with some embodiments of the invention, supported catalyst(s) may be combined with up to 6 wt % of continuity additives, prior to introduction to the reactor. The continuity additives are added to the catalyst by tumbling and/or other suitable means. In Catalyst A, for example, 3.0 wt % of aluminum stearate and 2.0 wt % Kemamine AS-990 are combined with the catalyst, prior to its introduction to the reactor.

In other embodiments, the metal fatty acids and/or antistatic agents are added as one or more separate feeds to the reactor; for example, as a slurry of the additive or antistatic agent in hydrocarbon diluents, as a solution in hydrocarbon diluents, or as a direct feed of solid particles (preferably as powders). One advantage of this method of addition is that it permits on-line adjustment of the feed rate of the additive, independent of the rate of catalyst feed. In other embodiments, the continuity additive(s) is added to the recycle line.

Examples of polymers that can be produced include the following: homopolymers and copolymers of $C_2$-$C_{18}$ alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; and polychloroprene; norbornene homopolymers and copolymers with one or more $C_2$-$C_{18}$ alpha olefin; terpolymers of one or more $C_2$-$C_{18}$ alpha olefins with a diene.

Monomers that can be present in a reactor monitored and optionally also controlled include one or more of: $C_2$-$C_{18}$ alpha olefins such as ethylene, propylene, and optionally at least one diene, for example, hexadiene, dicyclopentadiene, octadiene including methyloctadiene (e.g., 1-methyl-1,6-octadiene and 7-methyl-1,6-octadiene), norbornadiene, and ethylidene norbornene; and readily condensable monomers, for example, isoprene, styrene, butadiene, isobutylene, chloroprene, acrylonitrile, cyclic olefins such as norbornenes.

Fluidized bed polymerization can be monitored and optionally also controlled in accordance with some embodiments of the invention. The reaction can be any type of fluidized polymerization reaction and can be carried out in a single reactor or multiple reactors such as two or more reactors in series.

In various embodiments, any of many different types of polymerization catalysts can be used in a polymerization process monitored and optionally also controlled. A single catalyst may be used, or a mixture of catalysts may be employed, if desired. The catalyst can be soluble or insoluble, supported or unsupported. It may be a prepolymer, spray dried with or without a filler, a liquid, or a solution, slurry/suspension or dispersion. These catalysts may be used with cocatalysts and promoters well known in the art. Typically the cocatalysts and promoters may include alkylaluminums, alkylaluminum halides, alkylaluminum hydrides, as well as aluminoxanes. For illustrative purposes only, examples of suitable catalysts include Ziegler-Natta catalysts, chromium based catalysts, vanadium based catalysts (e.g., vanadium oxychloride and vanadium acetylacetonate), metallocene catalysts and other single-site or single-site-like catalysts as well as constrained geometry catalysts, cationic forms of metal halides (e.g., aluminum trihalides), anionic initiators (e.g., butyl lithiums), cobalt catalysts and mixtures thereof, nickel catalysts and mixtures thereof, iron catalysts and mixtures thereof, rare earth metal catalysts (i.e., those containing a metal having an atomic number in the Periodic Table of 57 to 103), such as compounds of cerium, lanthanum, praseodymium, gadolinium and neodymium.

In various embodiments, a polymerization reaction monitored and optionally also controlled can employ other additives, such as (for example) inert particulate particles.

It is to be understood that while the invention has been described in conjunction with the specific embodiments and examples thereof, the foregoing description is intended to illustrate and not limit the scope of the invention. Other aspects, advantages and modifications will be apparent to those skilled in the art to which the invention pertains.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

What is claimed is:

1. A method for using at least one static probe during performance of a polymerization reaction in a fluid bed reactor system to monitor a coating on a surface of the reactor system and a distal portion of said at least one static probe, wherein the coating is exposed to flowing fluid within the system during performance of the method, said method including steps of:
 (a) during a first interval of time during performance of the reaction in the reactor system, operating said at least one static probe to generate high speed data indicative of bubbling in the fluid bed; and
 (b) determining from the high speed data at least one electrical property of the coating;
 wherein the first interval of time includes a set of subintervals, and step (b) further includes the steps of:
 determining cross correlated values, by determining for said each subinterval of the first interval, a cross correlation of the high speed data generated in the subinterval with one of said high speed data generated in the subinterval and a processed version of said high speed data generated in the subinterval; and determining electrical potential in the fluid bed during said each subinterval of the first interval from the high speed data and the cross correlated values.

2. The method of claim 1, wherein said surface of the reactor system is a bed wall and the coating is exposed to flowing fluid within the fluid bed during the reaction.

3. The method of clam 1, wherein the coating is a film of polymer.

4. The method of claim 1, wherein the high speed data include frequency components in a range from about 1 Hz to about 10 Hz, and the first interval is at least one minute in duration.

5. The method of claim 4, wherein the high speed data are generated by sampling the output of the said at least one static probe with a sampling frequency of at least 100 Hz.

6. The method of claim 4, wherein the coating is a film of polymer having thickness less than 0.50 millimeters.

7. The method of claim 1, wherein at least one said electrical property is a breakdown voltage of the coating.

8. The method of claim 1, wherein the first interval of time includes a set of subintervals, the high speed data are indicative of average power drawn by the probe due to current induced in the probe by charge in the fluid bed during said each subinterval of the first interval, and step (b) includes the step of:

determining electrical potential in the fluid bed during said each subinterval of the first interval from the high speed data.

9. The method of claim 1, wherein the cross correlated values are indicative of movement of bubbles in the fluid bed past the static probe.

10. The method of claim 1, also including the steps of:
(c) after step (a) but during a second interval of time during performance of the reaction in the reactor system, operating the static probe to generate an additional high speed data indicative of bubbling in the fluid bed;
(d) determining from the additional high speed data at least one electrical property of the coating; and
(e) in response to the electrical properties determined during steps (b) and (d), monitoring at least one of deterioration and contamination of the coating over time.

11. The method of claim 1, wherein said at least one static probe is a bifunctional static probe comprising:

an insulated probe having an electrically insulating distal portion, coated with a portion of said coating that is exposed during step (a) to said flowing fluid, and a conductive proximal portion in contact with the distal portion; and an electrically conducting bare probe, positioned coaxially with the insulated probe and having an electrically conducting distal surface coated with another portion of said coating that is exposed during step (a) to said flowing fluid.

12. A bifunctional static probe configured for use in monitoring a polymerization reaction in a fluid bed reactor system according to the method of claim 1, including:

an insulated probe having an electrically insulating distal portion configured to be exposed during said monitoring to flowing fluid within the reactor system, and a conductive proximal portion in contact with the distal portion; and an electrically conducting bare probe, positioned coaxially with the insulated probe and having an electrically conducting distal surface configured to be exposed during said monitoring to the flowing fluid within the reactor system.

13. The static probe of claim 12, wherein the bare probe is at least substantially cylindrical, the insulated probe is at least substantially annular, and the distal surface of the bare probe is aligned with a distal surface of the insulated probe's insulating distal portion.

14. The bifunctional static probe of claim 12, also including electrical insulation between the insulated probe and the bare probe for insulating said insulated probe from said bare probe.

15. The bifunctional static probe of claim 12, wherein the bare probe has an outer side surface, the insulated probe has an inner side surface facing the bare probe's outer side surface, and the bifunctional static probe includes electrical insulation between the insulated probe's inner side surface and the bare probe's side surface for insulating the insulated probe from the bare probe.

16. The bifunctional static probe of claim 12, wherein said bifunctional probe includes readout circuitry coupled to the bare probe and to the insulated probe, wherein the readout circuitry is configured to assert simultaneously a bare probe output indicative of direct current flow from the fluid bed of the reactor system to a surface of the bare probe, and an insulated probe output indicative of inductive current flow from the fluid bed to the insulated probe.

17. A method for using at least one static probe during performance of a polymerization reaction in a fluid bed reactor system to monitor a coating comprising a film of polymer on a surface of the reactor system and a distal portion of said at least one static probe, where the coating is exposed to flowing fluid within the reactor system during the reaction, said method including steps of:

(a) during performance of the reaction in the reactor system, operating the static probe to generate high speed data indicative of fluid flow variation in the reactor system during a first interval of time; and (b) determining from the high speed data at least one electrical property of the coating;

wherein the first interval of time includes a set of subintervals, and step (b) further includes the steps of:

determining cross correlated values, by determining for said each subinterval of the first interval, a cross correlation of the high speed data generated in the subinterval with one of said high speed data generated in the subinterval and a processed version of said high speed data generated in the subinterval; and determining electrical potential in the fluid bed during said each subinterval of the first interval from the high speed data and the cross correlated values.

18. The method of claim 17, wherein said surface of the reactor system is a surface of an entrainment zone of said reactor system.

19. The method of claim 17, wherein said surface of the system is a bed wall and the flow region is the fluid bed of the reactor system.

* * * * *